Patented Dec. 18, 1945

2,391,258

UNITED STATES PATENT OFFICE 2,391,258

TREATMENT OF WATER CONTAINING CHLORIDES AND SODIUM DISSOLVED THEREIN

Howard D. Meincke, Jr., Glencoe, Ill., assignor to Howard D. Meincke, Sr., Glencoe, Ill.

No Drawing. Application March 25, 1944,
Serial No. 528,172

2 Claims. (Cl. 210—23)

This invention relates to a process for treating water, containing chlorides and sodium dissolved therein, in such manner as to render such water drinkable.

While my invention is capable of more general application, it is particularly useful for those who may have the misfortune to be adrift upon the open sea and with no available supply of fresh water. As is well known to those skilled in the art, sea water contains a combination of many salts in solution, among which are the chlorides of sodium, potassium, calcium and magnesium. Of these salts, the one which is present in the greatest proportion and which renders sea water unsuitable for drinking purposes, is sodium chloride. While it is, therefore, unimportant, from a sanitary standpoint, to remove chlorine from the chlorides other than sodium chloride, my process accomplishes the removal of a sufficient proportion of chlorine from all of the above chlorides to so reduce the remaining proportions of chlorides as to render them harmless; it also accomplishes the removal of sodium from the water.

I am aware that numerous attempts have been made to remove a sufficiently large proportion of sodium chloride from sea water to render the same drinkable, but these attempts have not been commercially or practically successful, owing to the high proportion of sodium chloride in such water. It is due to this high proportion of sodium chloride that it has been impossible to treat the same successfully for the effective removal of sodium chloride with zeolites or synthetic resins. Attempts have also been made to remove sodium chloride from sea water by chemical reagents capable of forming insoluble chlorides with the chlorine constituent of the sodium chloride, but the resultant sodium compounds which have been formed have been found to be physiologically harmful. This is the case where sea water is treated, for instance, with various silver salts. If silver nitrate or other silver compound is employed for such treatment, the chlorine constituent of the sodium chloride will combine with the silver to produce silver chloride, and the sodium nitrate which is produced is water soluble and is physiologically harmful. Further, where any silver compound is used for the treatment of sea water, silver chloride is produced and, while it is considered to be an insoluble chloride, the fact is that it is soluble to the extent of 1½ milligrams per litre of water, and since the poisoning effect of silver salts is cumulative, silver compounds should, therefore, not be used for the treatment of sea water.

The use of lead and mercurous salts for accomplishing the purpose of my invention is, of course, unthinkable because the chlorides of both of these elements are definitely poisonous when taken into the human system, even in the form of very dilute solutions.

Within recent years, a group of mercury compounds has been produced, known as the group of phenyl mercury compounds. It has been found that mercury, when utilized to produce any one of such compounds, does not react with chemical reagents in the same manner as the other, and ordinary, compounds of mercury. Furthermore, when properly purified, these phenyl mercury compounds are non-toxic, harmless if taken in reasonable doses, and of very high bactericidal power. Of these compounds I have found that phenyl mercury gluconate and phenyl mercury glutamate are capable of removing substantially all the chlorides from sea water by simple agitation of the latter, while the resultant compounds (gluconates and glutamates) are physiologically harmless. However, this treatment leaves in the water a proportion of sodium the presence of which has been found objectionable in some cases. Hence, for the purpose of removing the chlorides and also the sodium constituent of sea water, I first remove the chlorides by admixing with the water a water soluble phenyl mercury compound which will precipitate the chlorine constituents of the sea water as insoluble phenyl mercury chloride but which will unite with the sodium constituent of the sodium chloride to form a solution of sodium hydroxide; I then remove the sodium constituent of the sodium hydroxide by treating the water with a compound which will react with or hold the sodium constituent of the sodium hydroxide to form an insoluble precipitate therewith.

For the water soluble phenyl mercury compound, I employ phenyl mercury hydroxide which, when added to the sea water or similar saline water, will react therewith as follows:

$$C_6H_5HgOH + NaCl = C_6H_5HgCl + NaOH$$

The phenyl mercury chloride produced by this reaction is insoluble, but the sodium hydroxide remains in solution. I then treat the water containing the insoluble phenyl mercury chloride and the sodium hydroxide in solution with any of the well known base exchange resins, the said base exchange resins being capable of holding or uniting with the sodium of the sodium hydroxide.

The reaction which then occurs is as follows, where R denotes the base exchange resin:

$$R + NaOH = RNa + HOH$$

Since the RNa and the phenyl mercury chloride are both insoluble in water, they can be filtered from the water and the purified water collected for use.

Due to the treatment to which the sea water has been subjected, the salt has been removed therefrom and a very palatable water of low pH results.

In practice I have obtained good results by employing 100 grams of a base exchange resin to a pint of sea water. However, the proportions of base exchange resin to sea water may vary with the activity of the particular base exchange resin employed.

In the actual practice of my invention, the base exchange resin may be mixed with the phenyl mercury hydroxide and the precipitation of the phenyl mercury chloride and the sodium base exchange resin compound can be effected in about five minutes by agitating the mixture with the sea water.

Having thus described my invention, what I claim is:

1. The process of treating a saline solution, containing chlorine and sodium dissolved therein, said process consisting in adding to such solution phenyl mercury hydroxide and a base exchange resin in relative proportions such as to precipitate a major portion of the chlorine constituents of the chlorides in said solution as phenyl mercury chloride and to enable the base exchange resin to form an insoluble compound with the sodium constituent of the said water, and removing the precipitated chlorides and the aforesaid compound.

2. The process of treating a saline solution, containing chlorine and sodium dissolved therein, said process consisting in adding to such solution phenyl mercury hydroxide in a proportion such as to precipitate a major portion of the chlorine constituents of the chlorides in said solution as mercury chloride and a base exchange resin in the proportion of approximately 100 grams of the same to a pint of the said solution thereby to enable the base exchange resin to form an insoluble compound with the sodium constituent of the said solution, and removing the precipitated chlorides and the aforesaid compound.

HOWARD D. MEINCKE, Jr.